INTERMODULATION DISTORTION CORRECTION OF ANGLE MODULATED TRANSMISSION SYSTEM BY USE OF NONLINEAR CANCELLATION CIRCUIT

Filed Sept. 7, 1961

INVENTOR
M. R. AARON
BY R. B. Ardis
ATTORNEY 3,231,819

INTERMODULATION DISTORTION CORRECTION OF ANGLE MODULATED TRANSMISSION SYSTEM BY USE OF NONLINEAR CANCELLATION CIRCUIT

Marvin R. Aaron, Whippany, N.J., assignor to Bell Telephone Laboratories, Incorporated, New York, N.Y., a corporation of New York Filed Sept. 7, 1961, Ser. No. 136,637
3 Claims. (Cl. 325—65)

This invention relates to angle modulation transmission systems and more particularly to the elimination of intermodulation distortion in such systems.

In its most general form a transmission system employing angle modulation comprises a source of angle modulated signals, a transmission medium, and a demodulator. It is well known that transmission gain and phase deviations in the transmission path of the system introduce undesired phase and amplitude modulation into the transmitted signal, and as a result undesirable intermodulation products are present in the baseband signal after demodulation. Heretofore it has been believed that these intermodulation products could be eliminated only by equalization prior to demodulation, and that equalization could not be accomplished by operating on the baseband signal after demodulation.

It is an object of this invention to eliminate spurious intermodulation products in an angle modulated transmission signal by equalizing the baseband signal, and thereby not only eliminate the need for equalizing prior to demodulation but also provide a new tool in the field of angle modulation transmission systems.

In accordance with this invention the intermodulation products present in the baseband signal after demodulation are artificially constituted and subtracted from the baseband signal to produce a baseband signal substantially free of distortion. In a frequency modulation transmission system the frequency modulated signal is first demodulated and the demodulated signal squared and cubed in separate channels. The squared and cubed demodulated signals are then multiplied by predetermined constants, and, in addition, the squared signal is differentiated and the reset multiplied by a predetermined constant. The three multiplied signals are then added and the sum differentiated with the result that the output of the differentiator constitutes the undesired intermodulation products. The output from the differentiator is then subtracted from the demodulated signal to eliminate the undesired intermodulation products present in that signal.

In the case of a phase modulation transmission system the undesired intermodulation products are similarly constituted and subtracted from the demodulated signal. First the demodulated signal is differentiated and the output of the differentiator squared and cubed in separate channels. The output of the squaring circuit is then differentiated and multiplied by a predetermined constant. The multiplied signals are then added and the sum subtracted from the demodulated signal to yield a baseband signal free of distortion.

Figure 1:
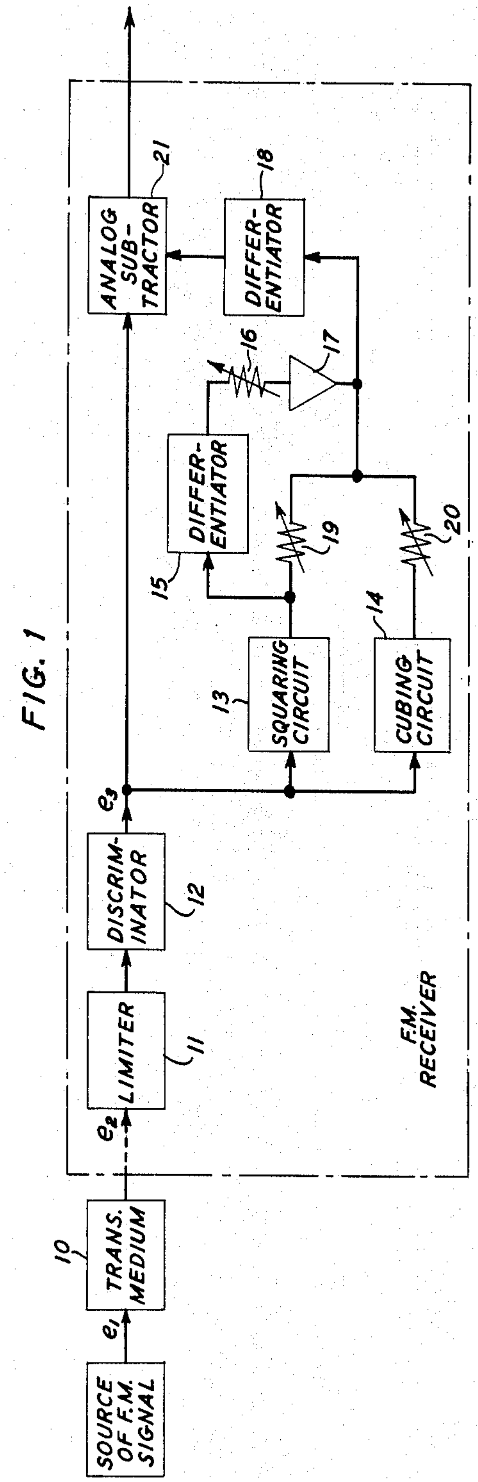
Figure 2:
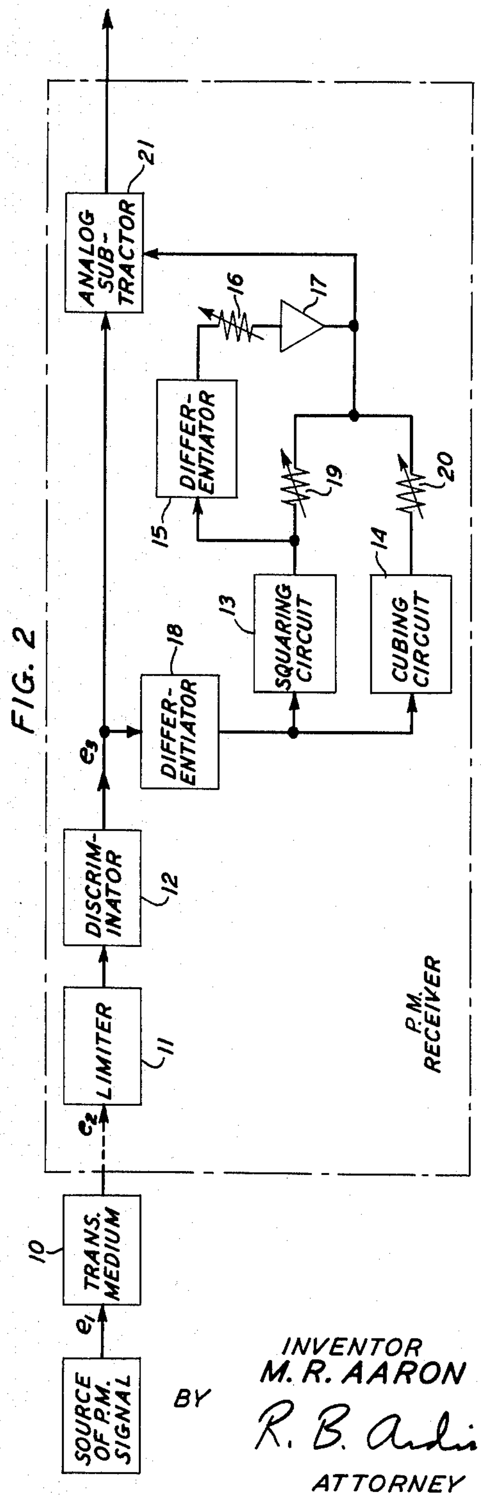

This invention will be more fully understood from the following detailed description of preferred embodiments taken in conjunction with the appended drawings, in which:

FIG. 1 is a schematic diagram of a post-demodulation equalizer embodying the invention employed in a frequency modulation transmission system; and FIG. 2 is a schematic diagram of a post-demodulation equalizer embodying the invention employed in a phase modulation transmission system.

The angle modulated input signal, $e_1$, applied to the transmission medium 10 shown in FIGS. 1 and 2 is assumed to be $$e_1(t)=A_c \cos [\omega_c t+\varphi(t)] \tag{1}$$

and the transmission characteristic of the transmission medium 10 is $$Y(\omega)=[1+g_1(\omega-\omega_c)+g_2(\omega-\omega_c)^2+g_3(\omega-\omega_c)^3] \epsilon^{j[b_2(\omega-\omega_c)^2+b_3(\omega-\omega_c)^3]} \tag{2}$$

where $e_1(t)$=applied FM or PM wave
$A_c$=constant amplitude of FM or PM wave
$\omega_c$=carrier frequency in radians per second
$\varphi(t)$=angle or phase modulation in radians
$Y(\omega)$=transmission characteristic which is function of radian frequency $\omega$.

Here $g_1$, $g_2$ and $g_3$ are constants which determine, respectively, the amount of linear, parabolic and cubic gain shape. Similarly $b_2$ and $b_3$ are constants which, respectively determine the amount of parabolic and cubic phase shape.

The transmission characteristic is normalized with respect to the carrier frequency such that the transmission at the carrier frequency is unity.

Equation 1 can also be written in exponential notation as $$e_1(t)=\begin{bmatrix}\text{Real}\\\text{Part}\\\text{of}\end{bmatrix} A_c\epsilon^{j[\omega_c t+\varphi(t)]} \tag{3}$$

At this point the bracket indicating that only the real part of the expression should be retained is dropped in order to simplify the expression which must be written. It will be re-inserted later in the derivation. This gives $$e_1(t)=A_c\epsilon^{j\omega_c t}\epsilon^{j\varphi(t)} \tag{4}$$

The spectrum, $G_1(\omega)$, of the input angular modulated wave, $e_1$, is given by the direct Fourier transform of $e_1(t)$ as $$G_1(\omega)=\frac{1}{2\pi}\int_{-\infty}^{\infty} e_1(t)\,\epsilon^{-j\omega t}dt$$
$$=\frac{A_c}{2\pi}\int_{-\infty}^{\infty} \epsilon^{j\omega_c t}\epsilon^{j\varphi(t)}\epsilon^{-j\omega t}dt \tag{5}$$

This is one of the equations of the familiar Fourier transform pair. If the spectrum of the signal were known and we wished to find the time-function, we use the inverse transform. Thus, for the signal we are discussing $$e_1(t)=A_c\epsilon^{j\omega_c t}\epsilon^{j\varphi(t)}=\int_{-\infty}^{\infty} G_1(\omega)\,\epsilon^{j\omega t}d\omega \tag{6}$$

It will be convenient to express equations of this type in the more concise notation:

$$G_1(\omega)=F[e_1(t)] \tag{7}$$

$$e_1(t)=F^{-1}(G_1(\omega)] \tag{8}$$

where $F[e_1(t)]$ and $F^{-1}[G_1(\omega)]$ denote respectively the direct and inverse Fourier transforms of the bracketed quantities.

If the transmission characteristic of the transmission path 10 to which the input signal $e_1$ is applied is $Y(\omega)$, the spectrum, $G_2(\omega)$, of the output signal $e_2$ from the transmission medium 10 is equal to $$G_2(\omega)=Y(\omega)G_1(\omega) \tag{9}$$

Thus every frequency component of the input signal $e_1$ is multiplied by the transmission at that frequency to obtain the output component at that frequency. Substitution of Equation 7 in 9 gives $$G_2(\omega)=Y(\omega)F[e_1(t)] \tag{10}$$

The output signal from the transmission path 10, $e_2(t)$, is given by the inverse Fourier transform of the output spectrum $G_2(\omega)$ as $$e_2(t)=F^{-1}[G_2(\omega)] \qquad (11)$$

Substitution of Equation 10 into 11 gives $$e_2(t)=F^{-1}[Y(\omega)F[e_1(t)]] \qquad (12)$$

$$e_2(t)=F^{-1}[Y(\omega)F[A_c\epsilon^{j\omega_c t}\epsilon^{j\varphi(t)}]] \qquad (13)$$

An alternative expression for the output signal can be obtained by substitution of Equation 9 into Equation 11

$$e_2(t)=F^{-1}[Y(\omega)G_1(\omega)]=\int_{-\infty}^{\infty} Y(\omega)G_1(\omega)\epsilon^{j\omega t}d\omega \qquad (14)$$

In this equation $\omega$ is simply a variable of integration which disappears when the limits are evaluated. It is, therefore, possible to replace $\omega$ by $\omega+\omega_c$ without changing the value of the integral. Equation 14 is then written as $$e_2(t)=\int_{-\infty}^{\infty} Y(\omega+\omega_c)G_1(\omega+\omega_c)\epsilon^{j(\omega+\omega_c)t}d\omega \qquad (15)$$

$$e_2(t)=\epsilon^{j\omega_c t}\int_{-\infty}^{\infty} Y(\omega+\omega_c)G_2(\omega+\omega_c)\epsilon^{j\omega t}d\omega \qquad (16)$$

In shorter form this becomes $$e_2(t)=\epsilon^{j\omega_c t}F^{-1}[Y(\omega+\omega_c)G_1(\omega+\omega_c)] \qquad (17)$$

From Equation 5 the expression for $G_1(\omega+\omega_c)$ is obtained by replacing $\omega$ by $\omega+\omega_c$.

$$G_1(\omega+\omega_c)=\frac{A_c}{2\pi}\int_{-\infty}^{\infty}\epsilon^{j\omega_c t}\epsilon^{j\varphi(t)}\epsilon^{-j(\omega+\omega_c)t}dt$$
$$=\frac{A_c}{2\pi}\int_{-\infty}^{\infty}\epsilon^{j\varphi(t)}\epsilon^{-j\omega t}dt$$
$$=F[A_c\epsilon^{j\varphi(t)}] \qquad (18)$$

Substitution of Equation 18 into 17 gives $$e_2(t)=A_c\epsilon^{j\omega_c t}F^{-1}[Y(\omega+\omega_c)F[\epsilon^{j\varphi(t)}]] \qquad (19)$$

Equation 19 shows that the effect of a transmission characteristic $Y(\omega)$ on an angle modulated wave can be expressed in terms of the effect of a transmission characteristic $Y(\omega+\omega_c)$ on the modulation term $\epsilon^{j\varphi(t)}$ of the angle modulated wave. This modulation term is the same as the actual angle modulated signal except that the carrier has been shifted from $\omega_c$ to zero frequency. The transmission characteristic $Y(\omega+\omega_c)$ is the same as the original characteristic $Y(\omega)$ except that it is shifted downward in frequency by an amount $\omega_c$. Thus, the transmission shape that is centered at $\omega_c$ in $Y(\omega)$ is moved downward and is centered at zero frequency in $Y(\omega+\omega_c)$.

The normalized transmission characteristic given in Equation 2 is now considered.

$$Y(\omega)=[1+g_1(\omega-\omega_c)+g_2(\omega-\omega_c)^2+g_3(\omega-\omega_c)^3]\epsilon^{j[b_2(\omega-\omega_c)^2]}\epsilon^{j[b_3(\omega-\omega_c)^3]} \qquad (2)$$

Here $g_1$, $g_2$, $g_3$, $b_2$, and $b_3$, are real constants. From Equation 2, $Y(\omega+\omega_c)$ becomes $$Y(\omega+\omega_c)=[1+g_1\omega+g_2\omega^2+g_3\omega^3]\epsilon^{j[b_2\omega^2+b_3\omega^3]} \qquad (20)$$

If the exponential is expanded using $$e^x=1+x+\frac{x^2}{2!}+\frac{x^3}{3!}\cdots$$

and only the terms of less than the fourth power of $\omega$ are retained (since in a practical FM system these are the terms of primary importance) this gives $$Y(\omega+\omega_c)=[1+g_1\omega+g_2\omega^2+g_3\omega^3][1+jb_2\omega^2+jb_3\omega^3]$$
$$=1+g_1\omega+(g_2+jb_2)\omega^2+(g_3+jb_3+jg_1b_2)\omega^3\cdots \qquad (21)$$

This result can be substituted in Equation 19. First Equation 21 is written in terms of the operator, $p=j\omega$.

$$Y(\omega+\omega_c)=1-jg_1p-(g_2+jb_2)p^2+j(g_3jb_3+jg_1b_2)p^3 \qquad (22)$$

From Fourier transform theory it is known that multiplication by $p$ in the frequency domain is equivalent to differentiation in the time domain. For example, $$F^{-1}[pF[f(t)]]=\frac{d}{dt}[f(t)]=f'(t) \qquad (23)$$

where $f(t)$ is any function of time. Similarly, $$F^{-1}[p^2F[f(t)]]=\frac{d^2}{dt^2}[f(t)]=f''(t) \qquad (24)$$

Equation 22 is substituted into Equation 19 and the result is written (using $\varphi$ to represent $\varphi(t)$ for the moment)

$$e_2(t)=A_c\epsilon^{j\omega_c t}\left[1-jg_1\frac{d}{dt}-(g_2+jb_2)\frac{d^2}{dt^2}+j(g_3+jb_3+jg_1b_2)\frac{d^3}{dt^3}\right]\epsilon^{j\varphi}$$
$$=A_c\epsilon^{j\omega_c t}\{\epsilon^{j\varphi}-jg_1[j\varphi']\epsilon^{j\varphi}-(g_2+jb_2)[(j\varphi')^2+j\varphi'']\epsilon^{j\varphi}+j(g_3+jb_3+jg_1b_2)[-3\varphi'\varphi''+j\varphi'''-j\varphi'^3]\epsilon^{j\varphi}\} \qquad (25)$$

The terms are collected to give $$e_2(t)=A_c\epsilon^{j[\omega_c t+\varphi(t)]}[1+P(t)+jQ(t)] \qquad (26)$$

where $$P(t)=g_1\varphi'(t)+g_2\varphi'^2(t)+b_2''(t)+3(b_3+g_1b_2)\varphi'(t)\varphi''(t)+g_3[\varphi'^3(t)-\varphi'''(t)] \qquad (27)$$

and $$Q(t)=-g_2\varphi''(t)+b_2\varphi'^2(t)+(-b_3-g_1b_2)[\varphi'''(t)-\varphi'^3(t)]-3g_3\varphi'(t)\varphi''(t) \qquad (28)$$

The final result is obtained by taking the reel part of the expression in Equation 26.

$$e_2(t)=A_c\{[1+P(t)]\cos[\omega_c t+\varphi(t)]-Q(t)\sin[\omega_c t+\varphi(t)]\} \qquad (29)$$

Equation 29 is written as the amplitude and phase modulation of the original input wave in the following manner, $$e_2(t)=A_c\sqrt{[1+P(t)]^2+[Q(t)]^2}\cos[\omega_c t+\varphi(t)+\theta(t)] \qquad (30)$$

where $$\theta(t)=\text{arc tan}\,\frac{Q(t)}{1+P(t)} \qquad (31)$$

When $P(t)<<1$ and $Q(t)<<1$, Equation 30 can be written approximately as $$e_2(t)=A_c[1+P(t)]\cos[\omega_c t+\varphi(t)+Q(t)] \qquad (32)$$

Therefore, the amplitude modulation is given approximately by $P(t)$ and the angle modulation is given approximately by $Q(t)$ when the transmission deviations are small. When we consider the more complex case where the carrier frequency $\omega_c$ is not centered in the middle of the intermediate frequency so that $\Delta=\omega_c-\omega_1$ then $$Y(\omega+\omega_c)=1+g_1(\omega+\Delta)+(g_2+jb_2(\omega+\Delta)^2+(g_3+jb_3+jg_1b_2)(\omega+\Delta)^3 \qquad (33)$$

After some algebra and the substitution $p=j\omega$ the output signal $e_2(t)$ is $$e_2(t)=A_c\epsilon^{j(\omega_c t+\varphi)}[[1+g_1\Delta+g_2\Delta^2+g_3\Delta^3+j(b_2\Delta^2+(b_3+g_1b_2)\Delta^3)]-j[g_1+(g_2jb_2)2\Delta+(g_3+jb_3+jg_1b_2)3\Delta^2]j\varphi^1-[g_2+jb_2+3\Delta(g_3+jb_3+jg_1b_2)][-(\varphi')^2+j\varphi'']+j[g_3+jb_3+jg_1b_2][-3\varphi'\varphi''+j\varphi'''-j\varphi'^3]] \quad (34)$$

These terms may be collected as was done with equation 25 to give:

$$e_2(t)=A_c\epsilon^{j[\omega_c t+\varphi]}[1+P(t)+jQ(t)] \quad (35)$$

or $$e_2(t)=A_c\sqrt{(1+P)^2+Q^2}\cos\left[\omega_c(t)+\varphi(t)+\tan^{-1}\frac{Q}{1+P}\right] \quad (36)$$

but in this case where the drift of the carrier frequency has been considered $$Q(t)=b_2\Delta^2+(b_3+g_1b_2)\Delta^3+(2b_2\Delta+b_3 3\Delta^2+3g_1b_2\Delta^2)\varphi'-g_2\varphi''-3\Delta g_3\varphi''+[b_2+(b_3+g_1b_3)3\Delta]\varphi'^2-(b_3+g_1b_2)[\varphi'''-\varphi'^3]-3g_3\varphi'\varphi'' \quad (37)$$

If an ideal demodulator is used in either an FM or PM system the amplitude modulation of the signal may be neglected. The unwanted phase and frequency modulation due to transmission deviations are, unlike the amplitude modulation, demodulated along with the desired signal. These distortion terms may be written in terms of the modulating signal $V(t)$ in view of the fact that for frequency modulation $$\varphi'(t)=K_1V(t)$$

and for phase modulation $$\varphi(t)=KV(t)$$

Thus in the case of a frequency modulated signal Equation 37 is differentiated to produce the demodulated signal. The various terms resulting from such differentiation are (1) $$(2b_2\Delta+b_3 3\Delta^2+3g_1b_2\Delta^2)\frac{d}{dt}\varphi=\alpha KV^1$$

(2) $$-(g_2+3\Delta g_3)\frac{d}{dt}KV'$$

(3) $$[b_2+(b_3+g_1b_2)3\Delta]\frac{d}{dt}(KV)^2$$

(4) $$(b_3+g_1b_2)\frac{d}{dt}(KV)^3 \quad (38)$$

(5) $$-(b_3+g_1b_2)\frac{d}{dt}(KV'')$$

(6) $$-3g_3\frac{d}{dt}K^2(VV')=-3g_3\frac{d}{dt}K^2\frac{1}{2}\frac{d}{dt}V^2=-\frac{3}{2}g_3\frac{t}{dt}\left[\frac{d}{dt}(KV)^2\right]$$

The first, second, and fifth terms are equalizable by linear means at baseband and will not be considered further. The other terms are modulation products which introduce distortion at frequencies at which there is no signal, and heretofore it has been considered impossible to eliminate such intermodulation distortion after demodulation.

In accordance with this invention intermodulation distortion is eliminated by artificially constituting the distortion and subtracting it from the demodulated signal. After the frequency modulated signal $e_1$ is passed through transmission medium 10 shown in FIG. 1 the signal $e_2$ appearing at the output of the transmission medium is applied to a conventional frequency modulation receiver so that after reduction to intermediate frequency it is applied to limiter 11 to eliminate any amplitude modulation and then demodulated by discriminator 12. The output of the discriminator is applied to a squaring circuit 13 and cubing circuit 14. The squaring circuit 13 may be that shown in Electron Tube Circuits by Samuel Seely, 2nd edition, 1958, page 272 and the cubing circuit may comprise the combination of the above-mentioned squaring circuit and a multiplier such as that shown on page 271 of the above reference to multiply the input signal by the output of the squaring circuit to produce the cube of the input signal. The output of the squaring circuit is directly applied to a differentiator 15 whose output is applied by means of the series combination of a resistor 16 and phase inverting amplifier 17 to the input of a differentiator 18. In the series path just described, squaring circuit 13, differentiator 15, variable resistor 16, phase inverting amplifier 17 and differentiator 18 combine to produce an output proportional to the fifth term of the group of terms (38) representing the intermodulation distortion. By suitable adjustment of the variable resistor 16, to be described below, the output of differentiator 18 in response to the input from this series path may be made equal to the fifth term of the distortion.

The output of squaring circuit 13 is also applied to differentiator 18 by means of variable resistor 19, and the output of differentiator 18 in response to this input is proportional to the third term of the group of terms (38). Again by suitable adjustment of resistor 19 this output may be made equal to the third term of the distortion.

To obtain the fourth term of the groups of terms (38) the output of discriminator 12 is applied to cubing circuit 14 and the cubed output applied to differentiator 18 by means of variable resistor 20. The output of the differentiator 18 in response to this input signal is proportional to the derivative of the cube of the input signal and by suitable adjustment of resistor 20 the output of the differentiator in response to this input is made equal to the fourth term of the distortion.

The signals appearing at the output of the differentiator 18 and the output of the discriminator 12 are applied to an analog subtractor 21 or difference amplifier such as that disclosed in Electron Tube Circuits by Samuel Seely, 2nd edition, 1958, page 246. Since the output of the discriminator 12 which is also applied to subtractor 21 comprises the desired demodulated signal as well as the undesired intermodulation products and the output of differentiator 18 comprises the undesired intermodulation products then the difference between these two signals, which appears at the output of the subtractor 21, comprises the desired demodulated signal with no undesired intermodulation products present. Thus in accordance with this invention the undesired intermodulation products have been eliminated after demodulation by artificially constituting them and subtracting them from the demodulated signal.

The variable resistors 16, 19, and 20 are adjusted in the following manner. A frequency modulated input signal modulated by a sine wave is applied to the transmission path 10. The square of such a signal will be a signal having twice the frequency of the sine wave, and the cube of such a signal will have a component having three times the frequency of the sine wave. A harmonic detector is connected to the output of analog subtractor 21 and initially tuned to a frequency which is twice that of the sine wave modulating signal. All the inputs to differentiator 18 are removed with the exception of that from amplifier 17. Resistor 16 is then adjusted until the harmonic analyzer records a minimum output signal. Then the input to differentiator 18 from resistor 19 is reconnected and the connection from amplifier 17 to differentiator 18 removed. Resistor 19 is then adjusted until the harmonic analyzer records a minimum output signal. As the final step in this procedure only resistor 20 is connected to the input to differentiator 18, the harmonic analyzer tuned to a frequency three times the frequency of the modulating signal and resistor 20 adjusted until the harmonic analyzer records a minimum output from the subtractor 21. With these preliminary adjustments the apparatus described above eliminates all the intermodulation distortion from the demodulated baseband signal for a given transmission medium 10.

In accordance with this invention the intermodulation products present in a phase modulated signal which are not equalizable by linear means may be removed after demodulation. From Equation 37 the terms producing such distortion in a phase modulated system are $$\begin{aligned}
&(1)\quad [b_2+(b_3+g_1b_3)3\Delta]\varphi'^2=[b_2+(b_3+g_1b_3)3\Delta]\left[\frac{d\varphi}{dt}\right]^2 \\
&(2)\quad (b_3+g_1b_2)(\varphi')^3=(b_3+g_1b_2)\left(\frac{d\varphi}{dt}\right)^2 \qquad (39) \\
&(3)\quad -3g_3\varphi'\varphi''=-3g_3\frac{d}{dt}[(\varphi')^2]=-\frac{3}{2}g_3\frac{d}{dt}\left[\frac{d\varphi}{dt}\right]^2
\end{aligned}$$

and these intermodulation products are obtainable from the circuit shown in FIG. 2. Here the differentiator 18 has been removed from the position shown in FIG. 1 and placed at the output of the discriminator 12. The variable resistors 16, 19 and 20 are adjusted as described above. The path comprising differentiator 18, squaring circuit 13 and variable resistor 19 produces a signal equal to the first term of the group of terms (39) representing the intermodulation distortion, the path comprising differentiator 18, cubing circuit 14 and variable resistors 20 produces a signal equal to the second term of the group (39); and the path comprising differentiator 18, squaring circuit 13, differentiator 15, variable resistor 16 and phase inverting amplifier 17 produces a signal equal to the third term. These intermodulation products are subtracted from the output of discriminator 12 thereby producing the baseband signal free of distortion.

It is to be understood that the above-described arrangements are illustrative of the application of the principles of the invention. For example, in the event higher order distortion terms beyond those determining cubic gain and phase shape are present the circuitry may be modified in accordance with this invention to eliminate the resulting distortion. Numerous other arrangements may be devised by those skilled in the art without departing from the spirit and scope of the invention.

What is claimed is:

1. An equalizer for eliminating intermodulation distortion products encountered in the demodulated signal of a transmitted angle modulated signal comprising, in combination, a source of an angle modulated signal, means to transmit said signal, means having an output terminal to demodulate said transmitted signal, means connected to said output terminal of said demodulation means to generate a signal proportional to the square of said demodulated signal, means connected to said output terminal of said demodulation means to generate a signal proportional to the cube of said demodulated signal, means to multiply said signal proportional to the square of said demodulated signal by a predetermined constant, means to multiply said signal proportional to the cube of said demodulated signal by a predetermined constant, differentiation means to differentiate said signal proportional to the square of said demodulated signal, means to multiply said differentiated signal by a predetermined constant, means to add said multiplied signals, and subtraction means having two input terminals a first of which is connected to said output terminal of said demodulation means and a second terminal for receiving signals proportional to said summed signals to subtract said signals proportional to said summed signals from said demodulated signal.

2. An equalizer for eliminating intermodulation distortion products encountered in the demodulated signal of a transmitted frequency modulated signal comprising, in combination, a source of a frequency modulated signal, means to transmit said signal, means having an output terminal to demodulate said transmitted signal, means connected to said output terminal of said demodulation means to square said demodulated signal, means connected to said output terminal of said demodulation means to cube said demodulated signal, means to multiply said squared and cubed signals by predetermined constants, means to differentiate said squared demodulated signal, means to multiply said differentiated signal by a predetermined constant, means to add said multiplied signals, second differentiator means having an output terminal to differentiate the summed signal, and subtraction means having two input terminals a first of which is connected to said output terminal of said demodulation means and a second of which is connected to said output terminal of said second differentiator means to subtract said differentiated summed signal from said demodulated signal.

3. An equalizer for eliminating intermodulation distortion products encountered in the demodulated signal comprising, in combination, a source of a phase modulated signal, means to transmit said signal, means having an output terminal to demodulate said transmitted signal, means connected to said output terminal of said demodulation means to differentiate said demodulated signal, means to square said differentiated signal, means to cube said differentiated signal, second differentiating means to differentiate said squared signal, means to multiply said squared and cubed signals by predetermined constants, means to multiply said differentiated squared signal by a predetermined constant, means to add said multiplied signals, and subtraction means having two input terminals a first of which is connected to said output terminal of said demodulation means and a second of which is connected to receive said summed signals to subtract said summed signals from said demodulated signal.

References Cited by the Examiner

UNITED STATES PATENTS

| | | | |
|---|---|---|---|
| 1,315,539 | 9/1919 | Carson | 328—163 |
| 2,154,398 | 4/1939 | Crosby | 329—132 |
| 2,272,401 | 2/1942 | Chaffe | 329—132 |
| 2,287,077 | 6/1942 | Abraham | 333—14 |
| 2,395,758 | 2/1946 | Potter | 333—14 |
| 2,410,489 | 11/1946 | Fitch | 332—18 |
| 2,692,333 | 10/1954 | Holmes | 328—143 |
| 2,753,526 | 7/1956 | Ketchledge | 333—28 |
| 2,776,410 | 1/1957 | Guanella | 325—65 |
| 2,784,256 | 3/1957 | Cherry | 333—19 |
| 2,851,661 | 9/1958 | Breland | 333—75 |
| 3,001,068 | 9/1961 | Morita et al. | 329—131 |

HERMAN KARL SAALBACH, *Primary Examiner.*